(12) United States Patent
Broome et al.

(10) Patent No.: US 11,872,844 B2
(45) Date of Patent: Jan. 16, 2024

(54) WHEEL COVER FOR A WHEEL OF A VEHICLE

(71) Applicant: Bayerische Motoren Werke Aktiengesellschaft, Munich (DE)

(72) Inventors: Timothy Broome, Munich (DE); Kristian Groth, Munich (DE); Andreas Krause, Stockdorf (DE); Georg Preyss, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 686 days.

(21) Appl. No.: 16/734,535

(22) Filed: Jan. 6, 2020

(65) Prior Publication Data

US 2020/0139756 A1 May 7, 2020

Related U.S. Application Data

(63) Continuation of application No. PCT/EP2018/067088, filed on Jun. 26, 2018.

(30) Foreign Application Priority Data

Jul. 7, 2017 (DE) ...................... 10 2017 211 697.8

(51) Int. Cl.
*B60B 7/06* (2006.01)
*B60B 7/04* (2006.01)
(Continued)

(52) U.S. Cl.
CPC ................ *B60B 7/066* (2013.01); *B60B 7/04* (2013.01); *B60B 7/063* (2013.01); *B60B 7/14* (2013.01); *B60B 7/18* (2013.01); *B60B 2360/32* (2013.01)

(58) Field of Classification Search
CPC ....... B60B 2360/32; B60B 7/066; B60B 7/04; B60B 7/063
See application file for complete search history.

(56) References Cited

U.S. PATENT DOCUMENTS 2,181,364 A * 11/1939 Burger .................... B60B 11/06
301/36.1
5,603,553 A * 2/1997 Klieber ................. B60B 7/0006
301/37.41
(Continued)

FOREIGN PATENT DOCUMENTS

CH 174850 A 1/1935
CN 201800450 U 4/2011
(Continued)

OTHER PUBLICATIONS

Chinese-language Office Action issued in Chinese Application No. 201880038284.X dated Jun. 22, 2022 with English translation (14 pages).
(Continued)

*Primary Examiner* — Scott A Browne
(74) *Attorney, Agent, or Firm* — Crowell & Moring LLP

(57) ABSTRACT

A wheel of a vehicle has a rim, a hub section and at least two spokes which connect the hub section to the rim. At least one spoke intermediate space between the spokes is at least partially covered by a covering element mounted on the wheel from the outside of the wheel. The covering element is held in the installed position by a fastening device. The fastening device is mounted from the inside of the wheel and is connected to a wheel flange arranged in the inside of the wheel.

15 Claims, 3 Drawing Sheets

(51) Int. Cl.
*B60B 7/14* (2006.01)
*B60B 7/18* (2006.01)

(56) References Cited

U.S. PATENT DOCUMENTS

| | | | |
|---|---|---|---|
| 7,246,860 | B1 | 7/2007 | Seitz |
| 8,020,945 | B2* | 9/2011 | Takeda ..................... B60B 7/14 301/37.108 |
| 2003/0047987 | A1 | 3/2003 | Enomoto et al. |
| 2004/0075333 | A1* | 4/2004 | Shih ....................... B60B 7/061 301/37.41 |
| 2011/0101766 | A1 | 5/2011 | Chinavare et al. |
| 2012/0013170 | A1 | 1/2012 | Renius et al. |
| 2012/0133197 | A1 | 5/2012 | Mengle et al. |

FOREIGN PATENT DOCUMENTS

| | | | | |
|---|---|---|---|---|
| DE | 10 2011 107 064 | A1 | 3/2012 | |
| DE | 10 2011 114 664 | A1 | 4/2012 | |
| DE | 102011114664 | A1 * | 4/2012 | ............... B60B 7/01 |
| GB | 2 259 891 | A | 3/1993 | |
| JP | 6-85101 | U | 12/1994 | |

OTHER PUBLICATIONS

International Search Report (PCT/ISA/210) issued in PCT Application No. PCT/EP2018/067088 dated Oct. 12, 2018 with English translation (four (4) pages).
German-language Written Opinion (PCT/ISA/237) issued in PCT Application No. PCT/EP2018/067088 dated Oct. 12, 2018 (six (6) pages).
German-language Office Action issued in counterpart German Application No. 102017211697.8 dated May 18, 2018 eight (8) pages).
Chinese-language Office Action issued in Chinese Application No. 201880038284 dated Jan. 19, 2023 with English translation (13 pages).

* cited by examiner

WHEEL COVER FOR A WHEEL OF A VEHICLE

CROSS REFERENCE TO RELATED APPLICATIONS

This application is a continuation of PCT International Application No. PCT/EP2018/067088, filed Jun. 26, 2018, which claims priority under 35 U.S.C. § 119 from German Patent Application No. 10 2017 211 697.8, filed Jul. 7, 2017, the entire disclosures of which are herein expressly incorporated by reference.

BACKGROUND AND SUMMARY OF THE INVENTION

The invention relates to a wheel of a vehicle. For prior art, reference is made by way of example to DE 10 2011 107 064 A1 and US 2011 0 101 766 A1.

A wide variety of demands are placed on wheels of vehicles, in particular on those of passenger cars. In addition to sufficient strength coupled with a low weight, the wheels are intended to be conducive to a good drag coefficient of the vehicle and to be distinguished by a pleasing visual appearance. This also includes the fact that the visible outer region of the wheels is soiled only to a small extent by the abrasion of the wheel brake provided on the inner side (i.e. the side facing the vehicle) of the wheels. In order in particular to ensure the latter, it is known to cover the clearances between all the spokes of a wheel by means of a single, disk-like covering element, which is provided on the inner side of the wheel, opposite the brake disk of the wheel brake, which brake disk rotates together with the wheel. In addition, covering elements are also known that cover spoke intermediate spaces individually.

Frequently, such covering elements are adhesively bonded or firmly screwed to the wheel to ensure a firm connection with the wheels of the vehicle. Changing or removing the covering elements, for example in the event of damage or in order to vary the design, is then possible only with difficulty, however.

In this case, there is a conflict of objectives between a stable and loss-proof connection of the covering element to the wheel and easy removal of the covering element.

DE 10 2011 107 064 A1 discloses, for example, a two-part covering element, which comprises an insert body and a snap ring or snap element, which are configured to engage in one another. When the snap ring and the insert body are pressed one into the other, snap-connecting elements create a secure snap connection.

Likewise, a two-part element for arranging in a spoke intermediate space is disclosed in US 2011 0 101 766 A1.

It is an object of the invention to provide a wheel of a vehicle having a covering element that is attached to the wheel in a loss-proof manner and ensures easy mounting and removal.

A wheel of a vehicle, in particular a passenger car, is provided, which comprises a rim and a hub portion or flange region (also known as wheel flange) and at least two spokes that connect this hub portion or flange region to the rim. The at least two mutually adjacent spokes form an intermediate space, known as the spoke intermediate space, which is covered at least partially by a covering element. The spoke intermediate space is preferably configured in a substantially triangular manner or in the form of a circle segment. In order to optimize the aerodynamic properties of the wheel, in particular that part of the spoke intermediate space that is spaced apart as little as possible from the rim of the wheel is covered by the covering element.

Furthermore, it is preferred for the at least one spoke intermediate space, which is at least partially covered by the covering element, to extend in a conical or funnel-shaped manner from the outside of the wheel in the direction of the inside of the wheel. In other words, the spoke intermediate space preferably becomes narrower or smaller toward the inner side of the wheel.

The inner side of the wheel and outer side of the wheel refer, within the meaning of this invention, to the position of the wheel in the installed state on the vehicle. In this case, one side of the wheel, namely the inner side of the wheel, faces the vehicle, while the other side of the wheel, namely the outer side of the wheel, faces away from the vehicle and is visible to outsiders. A brake disk or parts of the wheel suspension are usually flange-mounted on or attached to the inner side of the wheel, in particular the hub portion or the wheel flange.

In this case, the covering element is mounted on the wheel from the outer side of the wheel or from the wheel exterior, i.e. from the outside in the installed state of the wheel, and arranged on the outer side of the wheel. The covering element is thus attached to the outer side of the wheel or mounted on the wheel from the outside.

Provision is also made for the covering element to be held in the installed position by a fastening device. The fastening device is in this case arranged on the inner side of the wheel, namely on the wheel flange. The fastening device is thus attached to the inner side of the wheel, or is mounted on the wheel from the inside.

Particularly preferably, the fastening device is in this case arranged flat against the wheel flange. The wheel flange can represent for example the inner part of the hub portion and is more preferably itself formed in a planar or flat manner with a circular planar surface. The fastening device can then rest in a planar manner against such a surface that is planar, for example.

Furthermore, it is preferred for several covering elements to be held in the installed position on the outside of the wheel by the fastening device.

Provision is preferably made for the one piece fastening device to represent a fastening device for several covering elements that each at least partially cover a spoke intermediate space.

Such a fastening device of the covering element is advantageous in particular because, as a result, easily mountable and removable fastening of the covering element with at the same time a high level of loss security can be ensured. Should it be necessary, for any possible conceivable reasons, for example in the event of damage to the covering element or if the covering element is no longer required at all, to change or remove the latter, the covering element according to the invention ensures easy removal. By way of the fastening device, it is possible to not attach the covering element directly to the wheel, and so no variants or particular wheel designs have to be taken into consideration.

The fastening device itself is in this case more preferably connected to the wheel flange.

This connection can occur for example in a form-fitting manner, i.e. for example by inserting the fastening device into pre-existing screw holes of the wheel flange. Alternatively or additionally, the fastening device can also be connected to the wheel flange in a force-fitting or materially bonded manner.

Thus, provision is particularly preferably made for the fastening device, in addition to the abovementioned form fit, to be held by attaching a component connected to the wheel flange. In this case, the fastening device can be held or pressed in for example between the wheel flange and the component connected to the wheel flange.

During mounting, the form fit represents a kind of pre-positioning, while the actual attachment of the component connected to the wheel flange represents the fastening of the fastening device.

Furthermore, provision is preferably made for the fastening device to comprise at least one wing element, which at least partially overlaps at least one spoke intermediate space from the inside of the wheel. Particularly preferably, the wing element projects, coming from the inside of the wheel, into the spoke intermediate space, such that the covering element can be fastened thereto from the outside of the wheel. In this case, the fastening device can be configured for example in a star-shaped manner, wherein a circular or annular element rests in a planar or flat manner on the wheel flange, while at least one wing element (preferably several) project(s) into the spoke intermediate spaces.

Particularly preferably, the covering element is connected to the wing element in a form-fitting, force-fitting and/or materially bonded manner. For example, the wing element and the covering element can overlap one another or adjoin one another and in this case form a form fit. Alternatively or additionally, it is possible for the covering element to be screwed to the wing element or to be connected thereto by means of a clipped connection.

In order to ensure as secure a hold of the covering element within the spoke intermediate space or at the spoke intermediate space as possible, it is furthermore preferred for the fastening device to be in direct contact with the hub portion or with the flange region or the wheel flange of the wheel on the inner side of the wheel. In this case, it is possible for example for the fastening device itself to be held on the hub portion or on the flange. As mentioned above, this can be realized by a form-fitting, force-fitting or materially bonded connection of the inner covering element part to the wheel flange, but it is also possible for the fastening device to be held or clamped in place flat between the wheel flange and a component connected to the wheel flange. Such a component connected to the wheel flange can represent for example a brake disk or a part of a wheel suspension, which is usually connected to the hub portion or the wheel flange of the wheel by at least one screw connection. Thus, it is possible for example for the fastening device to be clamped or held flat between the component (i.e. for example the brake disk) connected to the wheel flange and the wheel flange itself.

In a further preferred embodiment of the invention, the fastening device or at least one wing element is held on the inner side of the wheel and projects through the spoke intermediate space to the outer side of the wheel. In this case, the region of the wing element that projects out on the outer side of the wheel is preferably held on or fastened to the spokes or the rim of the wheel.

In a next advantageous configuration of the invention, the covering element is connected to at least one spoke and/or to the rim in a form-fitting manner. For example, the covering elements or one of the latter can be hooked in place at the spoke edges by hooking connections. In this way, a firm fit of the covering element can be ensured.

Furthermore, it is possible in this connection for the covering element to be able to be hooked or clipped into an edge of an undercut of the rim or into the undercut itself. Such an undercut can be arranged for example at the rim of the wheel and extend around the entire circumference of the wheel or rim. It is also possible for the wing element of the fastening device to be held on the spoke or rim or to be connected thereto in a form-fitting manner.

For each additional connection of the covering element, in particular for hooking connections, the covering element can comprise a device or geometry that allows such a hooking or clipped connection.

The covering element itself is preferably formed at least in part from a plastic. For example, it can be formed from a plastic/metal layer composite, in which the metal layer is arranged in the direction of the outside of the wheel and the plastic layer is arranged in the direction of the inside of the wheel, or in the direction of the vehicle, in the installed state of the covering element.

It is also possible for the covering element to be formed at least partially from a flexible material. For example, in an above-described embodiment of a fastening device which projects through the spoke intermediate space to the outside of the wheel, at least the wing elements of the fastening device can be formed from a flexible plastic material. This allows easy introduction or plugging of the wing elements through the spoke intermediate space to the outside of the wheel.

Also provided is a method for mounting a wheel of a vehicle. In this case, the covering element is fastened to the wheel or in or at the spoke intermediate space by the fastening device being arranged on the inside of the wheel from the inside and the covering element being arranged at the spoke intermediate space by way of the fastening device from the outside of the wheel.

These and further features will become apparent not only from the claims and from the description but also from the drawings, wherein the individual features can each be implemented in isolation or in combination in the form of sub-combinations in an embodiment of the invention and can form embodiments which are advantageous and capable of being protected independently, for which protection is claimed here.

In the following, the invention is explained in more detail on the basis of four exemplary embodiments. In this case, all of the features that are described in more detail can be essential to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
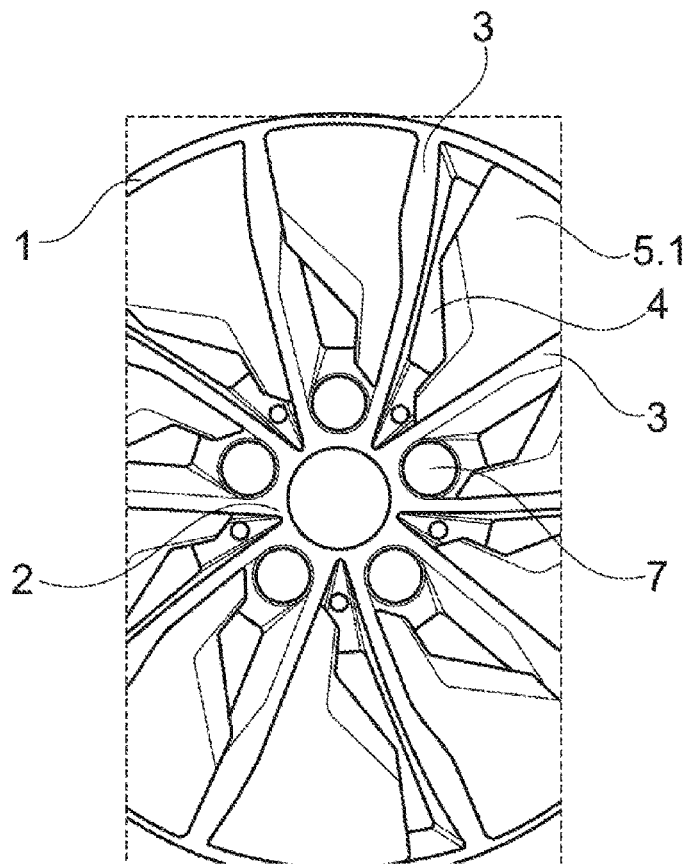
FIG. 1 shows a part of a wheel of a vehicle in a front view or outside view with exemplary covering elements.

FIG. 1 shows a part of a wheel of a vehicle in a three-dimensional view as seen from the outside A of the wheel. The wheel comprises a rim 1, a hub portion 2 and a plurality of spokes 3 that connect the hub portion 2 to the rim 1. The respectively mutually adjacent spokes 3 in this case form a spoke intermediate space 4. At least one of these spoke intermediate spaces 4 is at least partially covered by a covering element 5.1. The covering element 5.1 is in this case mounted on the wheel from the outside A of the wheel, or from the outer side A of the wheel.

The covering element 5.1 is in this case held in the installed position on the wheel by a fastening device 5.2. The fastening device 5.2 is, as shown in FIG. 2 in a view of the wheel from the inner side of the wheel, mounted on the inner side of the wheel and connected to the inner hub portion 2, known as the wheel flange.

The outside of the wheel, or the outer side of the wheel, in this case describes the side of the installed wheel that is visible from the outside when looking at the vehicle, while the inside of the wheel, or the inner side of the wheel, represents the side of the wheel that is directed in the direction of a vehicle structure in the installed state of the wheel. Thus, in FIG. 1, the outside of the wheel, or the outer side of the wheel, can be seen, and in FIG. 2, the inner side of the wheel can be seen.

Figure 2:
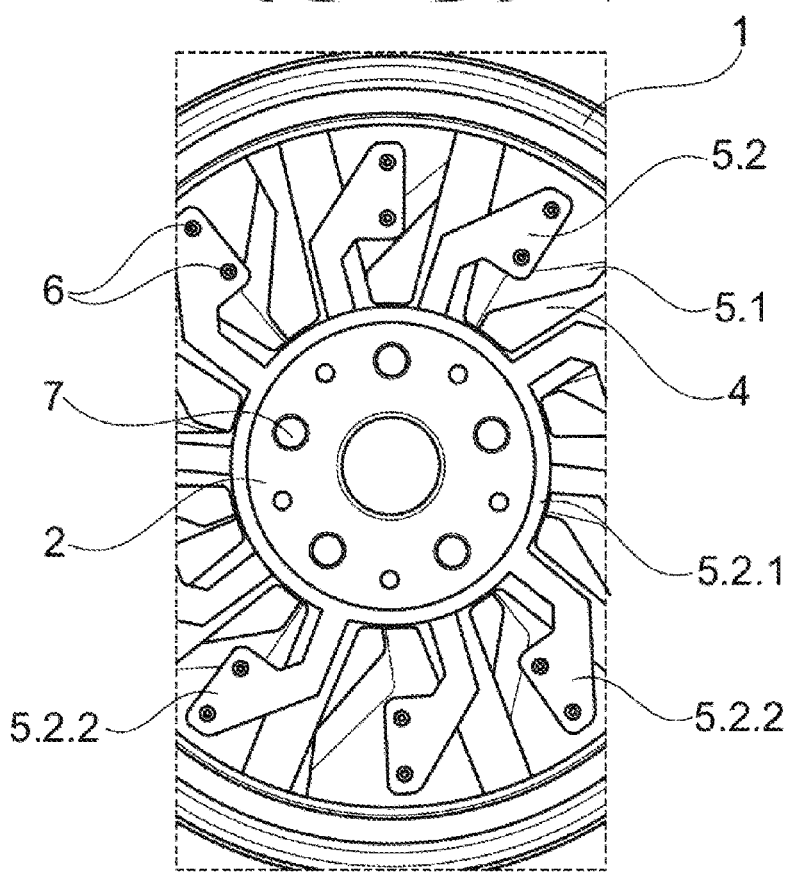
FIG. 2 shows the wheel from FIG. 1 in a rear view or inside view.

In this case, FIG. 1 shows a wheel of a vehicle in an outside view (i.e. the outside of the wheel), while in FIG. 2, the same wheel can be seen in an inside view (i.e. from the inner side of the wheel). In this specific example, each spoke intermediate space 4 of the wheel is at least partially covered with a covering element 5.1.

As can be seen in FIG. 2, the fastening device 5.2, in this case in the form of a ring 5.2.1, bears or rests flat against the (inner) hub portion or against the wheel flange 2. From the ring 5.2.1, at least approximately flat wing elements 5.2.2 each branch off along each spoke 3, said wing elements 5.2.2 at least partially covering the spoke intermediate spaces 4, coming from the inside of the wheel or on the inner side of the wheel.

As seen from the outside of the wheel, or the outer side A of the wheel, in FIG. 1, the covering elements 5.1 can be seen in each spoke intermediate space 4. The covering elements 5.1 can, following the mounting of the fastening device 5.2, cover (at least partially) the spoke intermediate spaces 4 by a suitable connection to the respective flat wing elements 5.2.2 of the fastening device 5.2 on the outer side of the wheel. In this specific example, the connection of the covering element 5.1 to the fastening device 5.2 is realized in the form of a screw connection 6.

As an alternative to such a screw connection 6, however, other forms of connection, for example a form fit or a material bond, are also contemplated. In particular for a desired easy releasability of the connection between the covering element 5.1 and the fastening device 5.2 and thus for easy removal of the covering element 5.1, a form-fitting connection is appropriate.

During the mounting of the wheel in FIG. 1 and FIG. 2, in a first step, the fastening device 5.2 is applied or prepositioned flat against the inner hub portion or the wheel flange 2. As can be seen in FIG. 2, provision is made for a further component (in particular a brake disk) to be fastened as flat as possible by means of suitable screw fittings 7 to the inner hub portion 2 of the wheel or the wheel flange 2. As a result of this further component being fastened flat after the prepositioning of the fastening device 5.2 on the hub portion 2, the ring 5.2.1 of the fastening device 5.2 is clamped in place between the component and the hub portion 2 and thus held firmly on the wheel.

Following this mounting step, the covering elements 5.1 can be attached individually at the desired spoke intermediate spaces 4 or to the flat wing elements 5.2.2 of the fastening device 5.2 from the outside. Since the flat wing elements 5.2.2, as seen in the radial direction of the wheel, are offset with respect to the outermost (circle) plane of the wheel, provision is made for the covering element 5.1 to be geometrically shaped such that it has a protrusion or shoulder, in order to be connected suitably to the fastening device 5.2.

Figure 3:
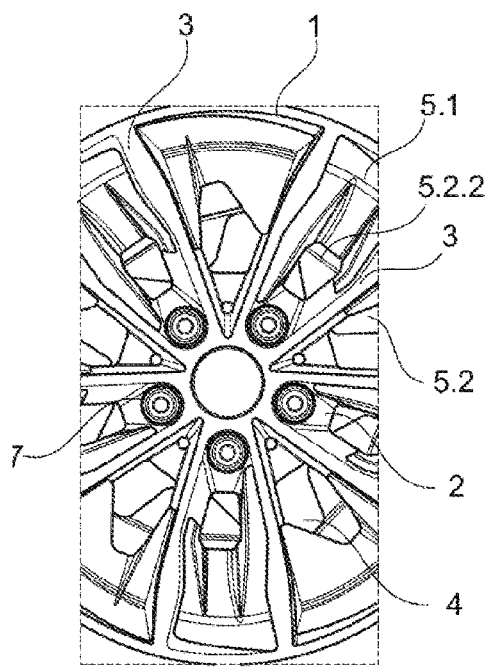
FIG. 3 shows a further exemplary embodiment of a wheel according to the invention of a vehicle in a front view.
Figure 4:
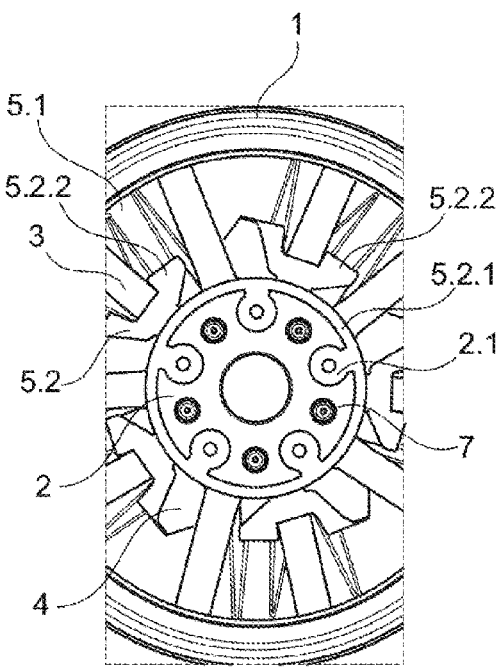
FIG. 4 shows the wheel from FIG. 3 in a rear view or inside view.
Figure 5:
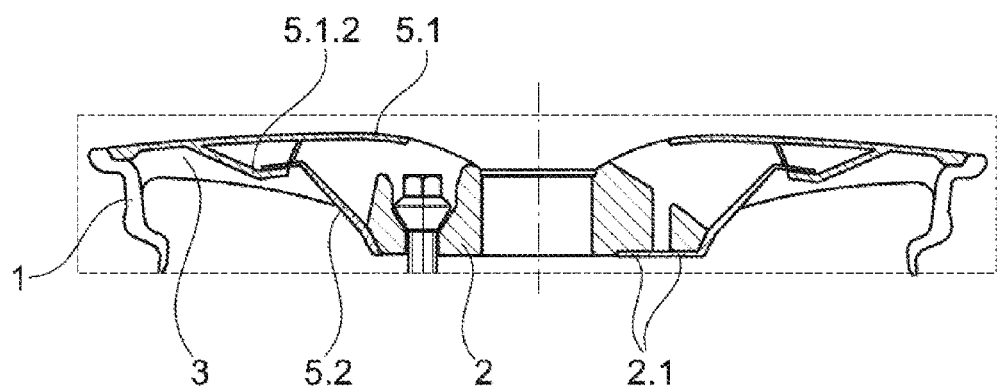
FIG. 5 shows a sectional view of the wheel from FIG. 3 and FIG. 4.
Figure 6:
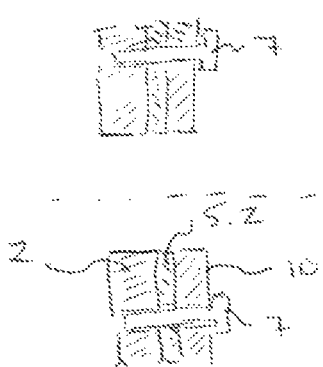
FIG. 6 is a highly schematic diagram illustrating the fastening device secured between the wheel flange and a component connected to the wheel flange.

FIG. 3, FIG. 4 and FIG. 5 show a further exemplary embodiment of a wheel according to the invention of a vehicle. As in the exemplary embodiment in FIG. 1 and FIG. 2, here too, all the spoke intermediate spaces 4 of the wheel are covered at least partially by a covering element 5.1. In FIG. 3, the wheel, or a part of the wheel, can be seen from the outer side of the wheel, while FIG. 4 shows the wheel from the inner side of the wheel.

As can be seen in FIG. 4, the fastening device 5.2 is again applied in the form of a ring 5.2.1 to the hub portion 2 or the wheel flange, wherein (at least approximately) flat wing elements 5.2.2 branch off from this ring 5.2.1 to the respective spoke intermediate spaces 4. In contrast to the example in FIGS. 1 and 2, the flat wing elements 5.2.2 each overlap a spoke 3 and then overlap in each case two spoke intermediate spaces 4. Likewise in contrast to the previous exemplary embodiment, the fastening device 5.2 is connected to the particular covering element 5.1 in a form-fitting manner. The fastening device 5.2 is in this case, as can be seen in FIG. 3, visible in the outside view of the wheel or from the outer side of the wheel.

The form-fitting connection between the covering element 5.1 and the fastening device 5.2 is shown in more detail and by way of example in a sectional view through the wheel in FIG. 5. Here, the fastening device 5.2 has been introduced into a receptacle 5.1.2 of the covering element 5.1. Furthermore, as is likewise apparent from FIG. 5 and FIG. 4, the ring 5.2.1, bearing against the hub portion 2, of the fastening device 5.2 is additionally arranged in cutouts 2.1 or blind holes in the inner hub surface 2. In this way, an additional form fit can be realized between the fastening device 5.2 and the hub portion 2.

The mounting sequence for mounting the wheel in FIGS. 3, 4 and 5 is the same as for the above-described wheel in FIGS. 1 and 2.

LIST OF REFERENCE SIGNS

1 Rim
1.1 Undercut
2 Hub portion or wheel flange
2.1 Cutout
3 Spoke
4 Spoke intermediate space
5 Covering element
5.1 Covering element
5.1.1 Groove
5.1.2 Receptacle
5.2 Fastening device
5.2.1 Ring
5.2.2 Flat wing element
6 Screw connection
7 Screw fittings
8 Form fit
A Outside of the wheel
I Inside of the wheel The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel of a vehicle, comprising:
 a rim;
 a hub portion;
 at least two spokes that connect the hub portion to the rim;
 a covering element mounted on the wheel from outside the wheel, wherein
 a spoke intermediate space between adjacent ones of the at least two spokes is at least partially covered by the covering element; and
 a fastening device mounted from inside the wheel, wherein
 the covering element is held in an installed position in the spoke intermediate space by a connection to the fastening device, the connection being located in the spoke intermediate space, and
 the fastening device is fixedly connected directly to a wheel flange separately from the holding of the covering element, the wheel flange being on the inside of the wheel.

2. The wheel according to claim 1, wherein
 a plurality of covering elements are held in the installed position on the outside of the wheel by the fastening device.

3. The wheel according to claim 1, wherein
 the fastening device is connected to the wheel flange in a form-fitting, force-fitting and/or materially bonded manner.

4. The wheel according to claim 3, wherein
 the fastening device rests on the wheel flange and is clamped between the wheel flange and a component connected to the wheel flange.

5. The wheel according to claim 1, wherein
 at least one wing element of the fastening device at least partially overlaps the spoke intermediate space from the inside of the wheel,
 the connection being located on a portion of the at least one wing element overlapping the spoke intermediate space.

6. The wheel according to claim 5, wherein
 the wing element of the fastening device projects into the spoke intermediate space from the inside of the wheel.

7. The wheel according to claim 5, wherein
 the wing element is connected to the covering element in a force-fitting, form-fitting and/or materially bonded manner.

8. The wheel according to claim 1, wherein
 the covering element is connected to at least one spoke and/or to the rim in a form-fitting manner.

9. The wheel of a vehicle according to claim 1, wherein
 the rim has an undercut extending in a circumferential direction of the wheel, to which undercut the covering element is attached.

10. The wheel of a vehicle according to claim 1, wherein
 at least a part of the covering element and/or of the fastening device is made of a plastic and/or of a flexible material.

11. A method of mounting a wheel of a vehicle, the wheel having a rim, a hub portion, at least two spokes that connect the hub portion to the rim, and a covering element that at least partially covers an intermediate space between adjacent ones of the at least two spokes, the method comprising:
 prepositioning a fastening device flat against a wheel flange arranged on an inner side of the wheel;
 clamping the fastening device in a transverse vehicle direction between a component connected to the wheel flange and the wheel flange; and
 connecting the covering element to the fastening device within the spoke intermediate space.

12. The method according to claim 11, further comprising:
 connecting the covering element to the fastening device from outside of the wheel.

13. The wheel of a vehicle according to claim 1, wherein
 the fastening device has a ring-shaped portion that bears against the wheel flange.

14. The wheel of a vehicle according to claim 13, wherein
 at least one wing element of the fastening device branches-off from the ring-shaped portion, and
 the covering element is held by the wing element.

15. A wheel of a vehicle, comprising:
 a rim;
 a hub portion;
 at least two spokes that connect the hub portion to the rim;
 a covering element mounted on the wheel from outside the wheel, wherein
 a spoke intermediate space between adjacent ones of the at least two spokes is at least partially covered by the covering element while leaving the at least two spokes exposed; and
 a fastening device mounted from inside the wheel, wherein
 the covering element is held in an installed position in the spoke intermediate space by a connection to the fastening device, the connection being located in the spoke intermediate space, and
 the fastening device is connected to a wheel flange separately from the holding of the covering element, the wheel flange being on the inside of the wheel.

* * * * *